Figure 1:
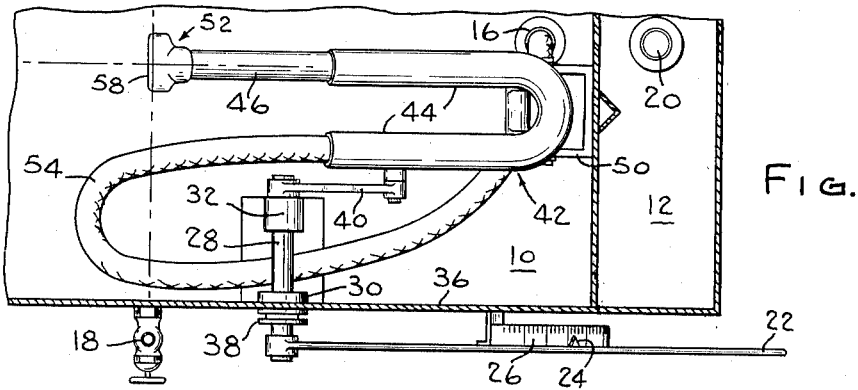

July 5, 1955  H. C. ECKLES  2,712,403
WATER MEASURING DEVICE
Filed May 15, 1950  2 Sheets-Sheet 1

INVENTOR.
HARRY C. ECKLES
BY John W. Michael
ATTORNEY

July 5, 1955  H. C. ECKLES  2,712,403
WATER MEASURING DEVICE
Filed May 15, 1950  2 Sheets-Sheet 2

INVENTOR.
HARRY C. ECKLES
BY John W. Michael
ATTORNEY

United States Patent Office 2,712,403
Patented July 5, 1955

2,712,403
WATER MEASURING DEVICE

Harry C. Eckles, Milwaukee, Wis., assignor to The T. L. Smith Company, Milwaukee, Wis., a corporation of Wisconsin Application May 15, 1950, Serial No. 162,088

3 Claims. (Cl. 222—434)

This invention relates to liquid measuring devices and particularly relates to mechanism for accurately metering water flow to the mixing drum of a concrete mixer.

While this invention is designed for use on all concrete mixers it is particularly adapted for use on transit type mixers. Transit mixers are generally provided with water tanks from which water may be drawn for mixing concrete or for flushing the mixing drum. It is necessary that the amount of water added to the drum be accurately determined and provision is made for a device for aiding in the measurement of the quantity. That such a device must be rugged when used on a truck type mixer is obvious.

A siphon action is preferred in drawing off the water since the sharp cut-off or venting action of a siphon permits of accurate determination of the quantity withdrawn. The prior art devices incorporating siphon action have not been as rugged as might be desired. Furthermore, the structures employed were complicated and costly, both in manufacture and in maintenance. While efforts were made to keep the cut-off point travelling on a vertical line to hold errors caused by truck tilt to a minimum, the head design introduced errors by allowing the cut-off point to vary with respect to the vertical line as the truck was tilted. These objections are overcome in the devices shown in the drawings.

An object of this invention is to provide a water measuring device of the type described where the siphon head and the cut-off point of the siphon follow a prescribed path which approximates a vertical line.

Another object is to provide a simple, rugged measuring device of the type described wherein the siphon head is carried on a link mounted in the tank for rotational and translational movement over a compensated path which approximates a vertical.

A further object is to provide a low-cost device of the type described.

Still another object is to provide a water measuring device which may be serviced easily.

A still further object is to provide a water measuring device having a siphon head providing accurate cut-off at all times.

Figure 2:
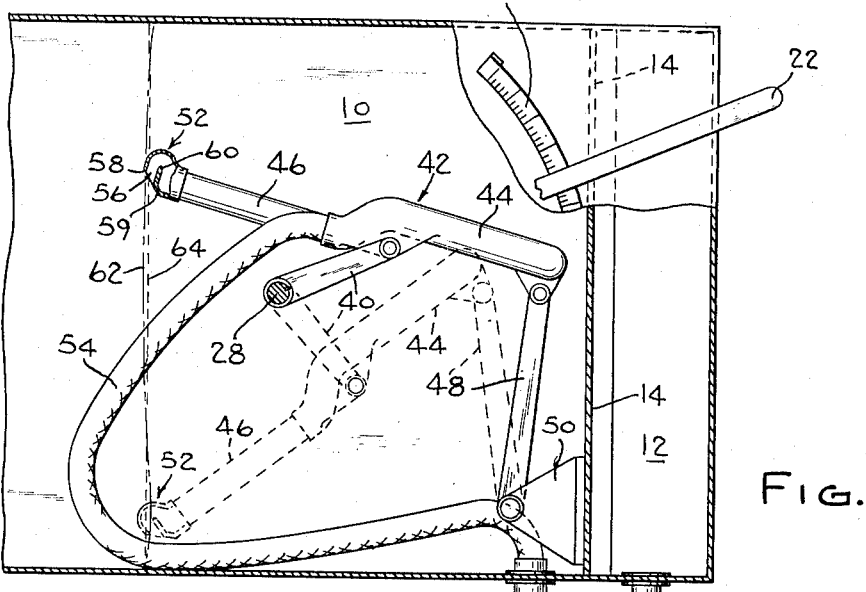
Figure 3:
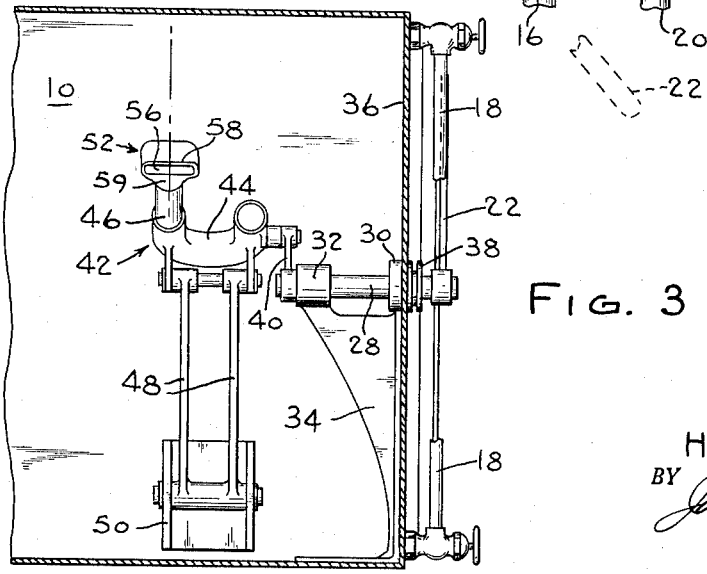
Figure 4:
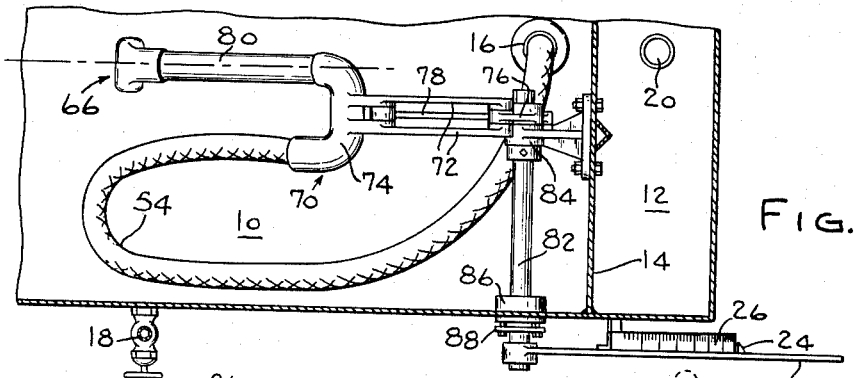
Figure 5:
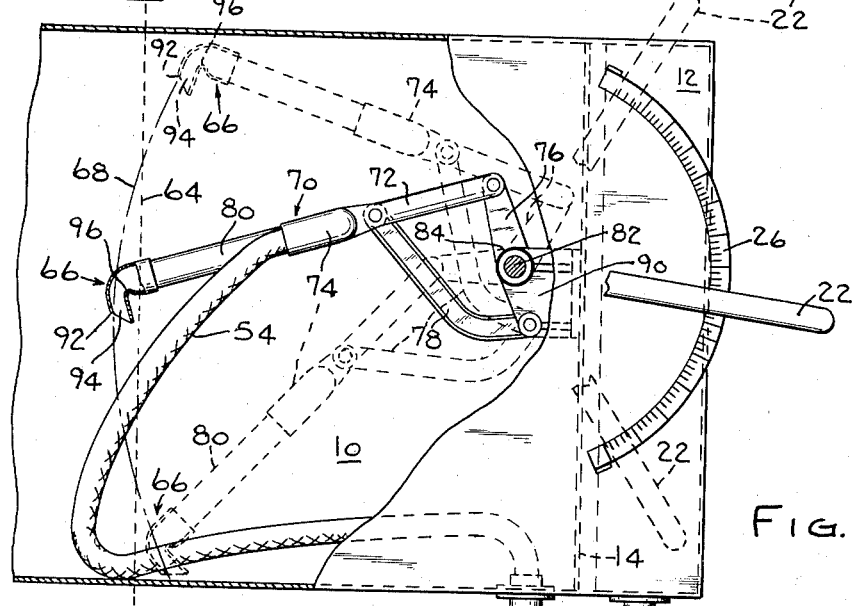
Figure 6:
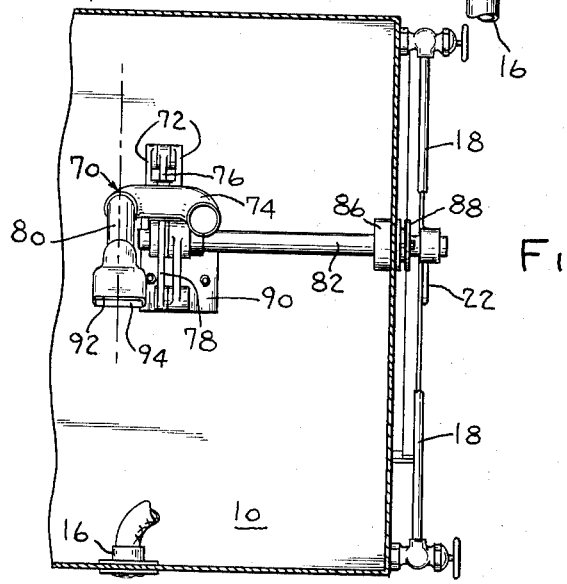

Other objects and advantages will be pointed out in, or be apparent from, the specification and claims, as will obvious modifications of the two embodiments shown in the drawings, in which:

Figs. 1, 2 and 3 are top, side and end views, respectively, of one embodiment of this invention; and Figs. 4, 5 and 6 are similar views of another modification.

Referring to the drawings in detail, the usual mix water tank 10 and flushing tank 12 are separated by a common bulkhead 14. According to the conventional practice, the mix water tank is filled and emptied through the orifice 16 and the water volume in the tank may be ascertained by reference to calibrated gauge glass 18. Of course, the usual valving arrangement, not shown, is employed to direct flow in the desired direction when filling or emptying the tank. Similarly, flushing tank 12 is filled and emptied through orifice 20 and the contents of the tank are indicated by a gauge glass, not shown.

These tanks are mounted on truck type mixers and are used when it is desired to mix the batch in transit. The quantity of dry materials being known, the quantity of water required may be ascertained by known methods. The gauge glass 18 will indicate the initial or tare amount of water in the mixing water tank 10. The water which will remain in the tank after the desired quantity is withdrawn is determined by subtraction.

Manually operable control arm 22 is now moved so that pointer 24 indicates the desired end quantity on the calibrated scale 26. In the modification of Figs. 1 through 3, arm 22 is keyed to shaft 28 which rotates in bearings 30, 32 carried by bracket 34 (inside the tank) and extends through a suitable seal 38 in the side wall 36 of the tank. Link or actuating lever 40 is keyed to the other end of shaft 28 and is pivotally connected to arm 42 comprised of a tubular U-shaped member 44 and a tubular extension 46 for one leg of member 44. Arm 42 is pivotally connected to a link or compensating lever 48 which is pivoted on a bracket 50 secured to bulkhead 14. Siphon head 52 is carried on the end of arm 42 (or, put another way, on the end of extension 46) and communicates with orifice 16 through the tubular link and flexible hose 54 connected to the short leg of the arm and to the orifice. Therefore, setting pointer 24 on control arm 22 at the desired end volume as indicated on scale 26 will move siphon head 52 to a predetermined position in the tank. When the valves are opened, siphon flow (generally augmented by a pump in practice) to the mixing drum starts and continues until the siphon is vented to stop flow at the desired point, leaving the predetermined end volume in the tank.

Referring to siphon head 52 in detail, it will be noted that rectangular mouth or intake 56 is formed transverse the arm axis so that a line connecting the outer edge 58 to inner edge 59 will approach parallelism with the bottom of the tank as the head is lowered or approaches the bottom. The head is provided with a dam 60 which makes the depending conduit of such length as to require upward flow when the head is adjacent the tank top and insures venting at edge 58 over the entire range of movement when the head is in its highest position in the tank. When the siphon head is in its highest position, the short leg of the siphon comprises the vertical distance between edge 58 and the upper edge of the dam. When the head is in its lowest position it will be appreciated that the effective short siphon leg is the vertical distance between edge 58 and the highest point of water travel which is the curved portion of the tubular link.

It will be appreciated that the accuracy of the device in drawing off the desired quantity of water depends upon accurate calibration of scale 26. If the scale is to be accurate, the siphon head must travel on a path approximating the vertical axis of the mix water tank and the venting point of the head must remain on the same path regardless of truck tilt. As pointed out above, the instant siphon head is designed so that the outer edge 58 of intake 56 constitutes the venting edge throughout the range of head movement. Tilt does not affect this vent or cut-off path. Reference to Fig. 2 illustrates the path of this edge in dot-dash line 62. That this path is quite close to the vertical axis 64 (dashed line) of the tank is readily apparent. The linkage employed in actuating the head obtains this path by imparting a combined rotational and translational movement to the link. Movement of link or actuating lever 40 causes the link to rotate, while link or compensating lever 48 simultaneously imparts translational movement to the arm to compensate for deviations from the vertical. The arm is moved to the right as the siphon head approaches the middle of the tank and is moved to the left as it moves from the middle of the tank, thus compensating the arcuate path which the head would tend to describe.

Reference to Fig. 5 will readily demonstrate that the modification shown in Figs. 4 through 6 does not cause the siphon head 66 to follow vertical axis 64 as closely as the other modification. However, the head path (dot-dash line 68) is close enough to provide accuracy sufficient to satisfy all present requirements. In this embodiment the arm 70 is comprised of spaced parallel members 72 carrying a tubular U-shaped member 74 and pivotally connected to link or actuating lever 76 and a curved link or compensating lever 78. Tubular extension 80 is connected to one leg of member 74 while the other leg is connected to orifice 16 by means of hose 54. Actuating lever or link 76 is keyed to shaft 82 which is journalled in bracket bearing 84 and bearing 86 on wall 36 where it passes through seal 88 for connection to arm 22. Compensating lever or link 78 is pivotally connected to bracket 90 secured to bulkhead 14. Since the entire linkage is carried on bracket 90, it will be appreciated that the cost of manufacture, assembly and installation of this modification is lower than the first modification.

Siphon head 66 is slightly different than head 52 but operates in the same manner. Thus the outer edge 92 of intake 94 is always highest and is, therefore, always the venting point. The head is basically an elbow but has a slight dam 96 formed at the bend to insure siphon action over the entire range of movement.

As pointed out above, this modification is not as accurate as the first but may be suitably calibrated to meet the necessary requirements. The linkage obtains an arcuate path. This path has an effective center well outside the tank as a result of the combined rotational and translational action of the link. The deviation from the vertical is readily compensated in calibrating scale 26 since the deviation is known (as distinguished from prior art devices where truck tilt could adversely affect the theoretical vent point path and render the calibration inaccurate).

The modification of Figs. 4 through 6 is somewhat objectionable in that movement of control arm 22 is opposite the movement of the siphon head. Thus the head is lowered as the arm is raised. It will be appreciated that this merely requires the operator to become accustomed to the action. In the modification of Figs. 1 through 3 the arm movement is similar to head movement and is not a problem.

Both modifications are extremely rugged and are subject to little wear. Any servicing which may be required is simple. Where extreme accuracy is desired, the modification of Figs. 1 through 3 may be used to advantage since the extra cost is justified.

The combined rotational and translational movement imparted to the arm (in both modifications) is obtained by a linkage. That the linkages are different is readily apparent. In both cases, however, the lever or link connected to the end of the arm pivotally supports the arm while confining movement of the end to a prescribed path the major dimension of which is horizontal while the lever or link pivotally connected to the arm at an intermediate point confines movement of the point to a path the major dimension of which is vertical. Thus the lever or link connected at the intermediate point imparts the major upward and downward movement while the other lever or link imparts the major horizontal movement to the arm to compensate for deviations from the vertical so the combined effect is to cause the siphon head to travel over a path approximating a vertical. While the actuating lever or link is connected to the arm at an intermediate point in one linkage and is connected to the end of the arm in the other, it will be appreciated that the above described functions are generic to both modifications.

It will be appreciated that other linkages may be designed to serve this end. Similarly, a linkage employing a cam track in place of the pivot connection between the arm and the compensating lever or link may be used, but this construction is more costly and apt to jam and is not, therefore, thought to be desirable. Modifications of other parts will occur. Therefore, this invention is not to be limited by the disclosure but is to be limited only by the scope of the claims.

I claim:

1. A siphon type water measuring device comprising, a tank having an outlet, an arm movably mounted in said tank and having one end movable between the top and the bottom of said tank, a siphon head on said one end, linkage means including said arm for moving said siphon head in a substantially vertical path, conduit means connecting said head to said outlet, said head including a depending intake of sufficient length to provide a short siphon leg when said head is at the top of said tank, the mouth of said intake being transverse said arm and lying in a plane which approaches parallelism with the bottom of said tank as the head approaches said bottom and means operable externally of the tank for moving the arm.

2. A siphon type water measuring device comprising, a tank having an outlet, an arm movably mounted in said tank and having one end movable between the top and the bottom of said tank, said arm being upwardly inclined when at said top and downwardly inclined when at said bottom, a siphon head on said one end, means mounting said arm for substantially straight line movement of said siphon head in a substantially vertical path, conduit means connecting said head to said outlet, said head including a depending intake having a dam of sufficient length to define an upward flow therethrough when the head is adjacent the tank top and having a mouth lying in a plane which approaches parallelism with the bottom of the tank as the head approaches the bottom of said tank, and means operable externally of said tank for moving the arm.

3. A water measuring device adapted for use with concrete mixers, comprising, a tank having an outlet, a movable arm in said tank, a syphon head at one end of said arm and including a depending intake member, means connecting said head to said outlet, an upwardly directed swinging link pivotally supporting the other end of said arm and guiding said other end over a prescribed path of movement defined by said link, the major dimension of said path being horizontal, a second link swingable about a point beneath said arm and intermediate the ends thereof and generally horizontally disposed with respect to the pivotal connection between the arm and said first link and movably supporting said arm, said second link being pivotally connected to said arm at an intermediate point on said arm and guiding said intermediate point over a path of movement, the major dimension of which is vertical, said supporting links cooperating to cause said intake member to travel in a path approximating a vertical when the arm is moved, said intake member including a dam of a height sufficient to define an upward path of flow in all positions of said head and having an intake opening the general plane of which approaches parallelism with the bottom of said tank as the head approaches said bottom.

References Cited in the file of this patent

UNITED STATES PATENTS

| | | |
|---|---|---|
| 640,081 | Beman | Dec. 26, 1899 |
| 1,291,280 | Upham | Jan. 14, 1919 |
| 2,147,048 | Long | Feb. 14, 1939 |

OTHER REFERENCES

Elements of Mechanism by Schwamb, Merrill and James; published by John Wiley & Sons; third edition, 1921; pages 292 to 294.